(12) United States Patent
Bruce et al.

(10) Patent No.: US 7,716,389 B1
(45) Date of Patent: May 11, 2010

(54) DIRECT MEMORY ACCESS CONTROLLER WITH ENCRYPTION AND DECRYPTION FOR NON-BLOCKING HIGH BANDWIDTH I/O TRANSACTIONS

(75) Inventors: Rey Bruce, San Jose, CA (US); Raquel Bautista David, Manila (PH); Shielou Vicencio Estrada, Pasig (PH)

(73) Assignee: BiTMICRO Networks, Inc., Fremont, CA (US)

( * ) Notice: Subject to any disclaimer, the term of this patent is extended or adjusted under 35 U.S.C. 154(b) by 483 days.

(21) Appl. No.: 11/378,762

(22) Filed: Mar. 17, 2006

(51) Int. Cl.
*G06F 3/00* (2006.01)
*G06F 13/00* (2006.01)
*H04Q 7/24* (2006.01)
*H04L 12/28* (2006.01)

(52) U.S. Cl. .............. 710/22; 710/1; 710/110; 380/277; 380/255; 370/338; 370/392; 370/466

(58) Field of Classification Search .......... 710/1, 710/22, 110; 370/338, 392, 466; 380/255, 380/277
See application file for complete search history.

(56) References Cited

U.S. PATENT DOCUMENTS

| | | | |
|---|---|---|---|
| 5,644,784 A | 7/1997 | Peek | |
| 5,875,351 A * | 2/1999 | Riley | ............... 710/22 |
| 5,943,421 A | 8/1999 | Grabon | |
| 6,298,071 B1 * | 10/2001 | Taylor et al. | ............... 370/486 |
| 6,363,444 B1 * | 3/2002 | Platko et al. | ............... 710/110 |
| 6,404,772 B1 * | 6/2002 | Beach et al. | ............... 370/443 |
| 6,526,506 B1 * | 2/2003 | Lewis | ............... 713/153 |
| 6,857,076 B1 | 2/2005 | Klein | |
| 6,970,446 B2 * | 11/2005 | Krischer et al. | ............... 370/338 |
| 7,194,766 B2 * | 3/2007 | Noehring et al. | ............... 726/13 |
| 7,372,962 B2 * | 5/2008 | Fujimoto et al. | ............... 380/255 |
| 2002/0073324 A1 | 6/2002 | Hsu et al. | |
| 2007/0083680 A1 * | 4/2007 | King et al. | ............... 710/22 |
| 2007/0195957 A1 * | 8/2007 | Arulambalam et al. | ........ 380/277 |

FOREIGN PATENT DOCUMENTS

JP     2004-127068     4/2004

* cited by examiner

*Primary Examiner*—Tammara Peyton
(74) *Attorney, Agent, or Firm*—Dennis Fernandez; Stephen R. Uriarte

(57) ABSTRACT

Due to the integration of multiple I/O device controllers in a storage controller and the need to provide secure and fast data transfers between the I/O devices and the storage controller, an architecture that can perform multiple encrypt/decrypt operations simultaneously is therefore needed to service multiple transfer requests without a negative impact on the speed of transfer and processing. The present invention relates to enhancing Direct Memory Access (DMA) operations between multiple IO devices and a storage controller by adding a Data Processing Core. Exemplary implementations are provided to illustrate the background mechanism used by a DMA controller that minimizes central-processing-unit (CPU) intervention and the multi-channel architecture which allows multiple IO requests to be serviced simultaneously.

23 Claims, 10 Drawing Sheets

DIRECT MEMORY ACCESS CONTROLLER WITH ENCRYPTION AND DECRYPTION FOR NON-BLOCKING HIGH BANDWIDTH I/O TRANSACTIONS

BACKGROUND

1. Field

The present invention relates to computer systems. More particularly, the present invention relates to a direct-memory access controller with a data processing core that performs data encryption and decryption.

2. Description of Related Art

Digital data processing is a process of manipulating data based on a computer algorithm. Basic functions such as fixed point arithmetic are performed by the CPU using its arithmetic logic unit module. But complex algorithms demand more computing resources and are executed in dedicated data processing modules with very minimal CPU help. With the advent of System-On-Chip (SOC) technology, engineers are able to implement highly specialized and complex algorithms inside an Application Specific Integrated Circuit (ASIC). This results in very fast computations since the CPU, fast SRAM memory, DMA Controller and data processing modules are all located inside the ASIC.

A DMA Controller (DMAC) is a dedicated device that is programmed by the CPU to perform a sequence of data transfers on behalf of the CPU. It can directly access memory and is used to transfer data from one memory location to another or from an I/O device to memory and vice versa. It manages several DMA Channels, each of which can be programmed to perform a sequence of DMA transfers. A DMAC typically shares the system memory and I/O bus with the CPU. This architecture enables the DMAC to operate in parallel with the CPU to some extent. This however requires that the DMA Channel is first programmed by the CPU using a descriptor table. This table basically contains all the necessary information to initiate, monitor and sustain the DMA operation. DMAC interrupts the CPU whenever a DMA channel terminates. Thus, it requires less CPU time than that of servicing interrupts or polling if DMA is not used. Some DMACs minimize CPU intervention further by having a chain address register that points to a chain table in memory. The chaining allows the DMAC to automatically fetch and load a new descriptor table in its DMA Channel. This feature is useful for transferring blocks of data into noncontiguous buffer areas.

A typical DMAC during a write transaction receives data from an I/O device and writes this data directly to memory. During a read transaction, the DMAC fetches the data from memory and routes it to an I/O device. If data processing is to be performed using a dedicated data processing module, the DMAC reads the input data from memory and then transfers this to the data processing module. The output of the data processing module is then written back to the memory by the DMAC. This constitutes a memory to memory transfer.

For a write transaction with data processing, the DMAC would have to first transfer the data from an I/O device to memory, read the same data from memory, feed the data to the data processing module, and write the output back to memory. For a read transaction with data processing, the DMAC would have to first read the data from memory, feed the data to the data processing module, and transfer the output to an I/O device. An extra memory to memory transfer is thus required.

The DMAC is configured by the CPU to transfer data between memory and one or more I/O devices. For a multiple I/O device configuration, the DMAC has to handle simultaneous transactions with these I/O devices. An additional memory to memory transfer greatly reduces the speed by which multiple transfer-with-data-processing transactions are completed.

A common algorithm implemented in data processing modules is encryption and decryption of digital data. Performing this process greatly enhances the security of data transfer. A typical application of this data processing is for storage of critical data. An external data source would request transfer of data to the storage controller SOC, and additionally would request that the transfer be a write transfer with encryption. To be able to maximize security, data has to be encrypted immediately once it is received. For read operations, an external data destination would request a read transfer with decryption. Another application of this data processing is the cipher engine. The cipher engine provides encryption and decryption services to all the data sources attached to it. In this application, the processed data are not stored but are immediately returned to the source in which case the memory device is only used as a temporary buffer.

Most encryption algorithms such as Advanced Encryption Standard (AES), Data Encryption Standard (DES) and Blowfish require a large amount of computing resources. An architecture that is able to perform multiple encrypt/decrypt operations simultaneously is therefore needed to service multiple transfer requests, without a negative impact on the speed of transfer and processing.

It is therefore the objective of this invention to provide a DMA controller with an encryption and decryption processor that is able to service simultaneous data transfer requests. It is further the objective of this invention to provide a DMA controller with an encryption and decryption processor that eliminates the need for extra memory to memory transfers. It is further the objective of this invention to provide a DMA controller that can process both a normal transfer request and a transfer request with encryption and decryption.

SUMMARY OF THE INVENTION

The underlying principle of DMA is reused to perform encryption and decryption of data by attaching a Data Processing Core (DPC) in the system bus. A DPC is an independent core which is programmed by the CPU to operate in tandem with a DMAC. The DPC comprises an address compare engine for monitoring the address of a DMA request and for routing data between the DMAC and the DPC, one or more DPC engines which implement various encryption and decryption algorithms such as AES, DES, Blowfish etc., one or more DPC channels for storing descriptor tables and for controlling the one or more DPC engines, a data buffer for temporarily storing data to be encrypted, a data buffer for temporarily storing encrypted data, a data buffer for temporarily storing data to be decrypted, a data buffer for temporarily storing decrypted data. This DPC can enable encryption and decryption of data based on the address of the DMA request. It can process non-contiguous set of data for a scatter-gather operation using linked lists. It is expandable to any number of independent DPC Channels and supports simultaneous data processing in its multiple DPC engines. The DPC engines are configurable in its use of encryption algorithm, key size and encryption mode based on the descriptor tables associated with the DPC Channels.

Other structures and methods are disclosed in the detailed description below. This summary does not purport to define the invention. The invention is defined by the claims.

DETAILED DESCRIPTION OF THE INVENTION

Figure 1:
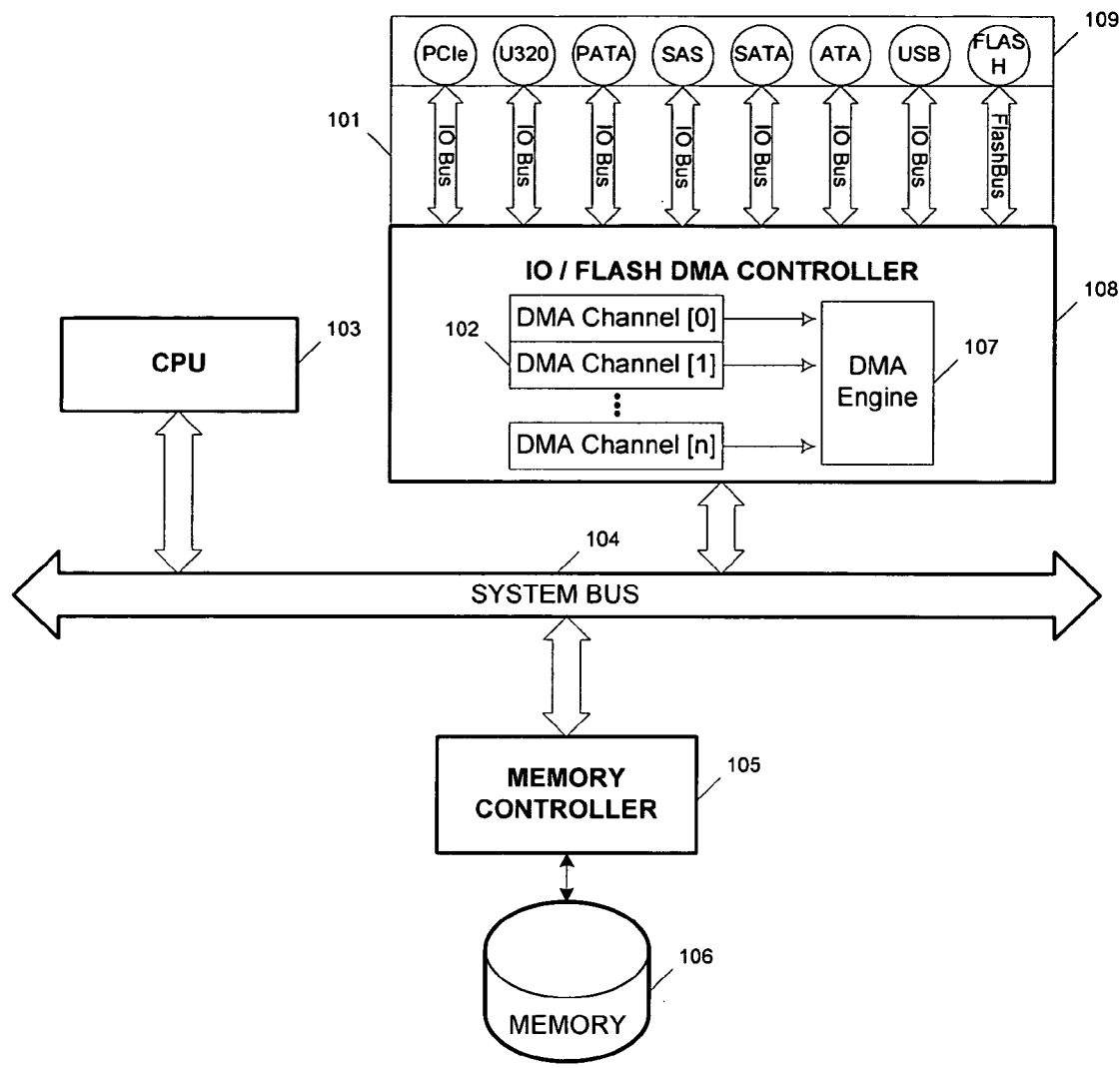
FIG. 1 is a diagram illustrating a typical DMA architecture.

FIG. 1 is a diagram illustrating a typical DMA architecture. The DMA Engine 107 is located inside an IO/Flash DMA Controller 108. Multiple DMA Channels such as 102 are used to support simultaneous DMA requests from different IO devices 109 which are connected via an IO bus 101. CPU 103 receives IO requests from these devices. The CPU then programs the DMA Channels 102 by creating descriptor tables in the memory 106. The descriptor table contains DMA-related information such as the transfer count, source of data and destination of data. The DMA Engine 107 fetches and uses the descriptor table to perform the data transfer. DMA Engine 107 sends either a read or write request to the Memory Controller 105 by driving the system bus 104. For an IO-write transaction, this involves the transfer of data from the IO device 109 to the memory 106. For an IO-read transaction, data is moved from the memory 106 to the IO device 109. The Memory Controller 105 manages all the write and read requests received from the DMA Engine 107. The memory controller 105 communicates directly with the memory device 106.

Figure 2:
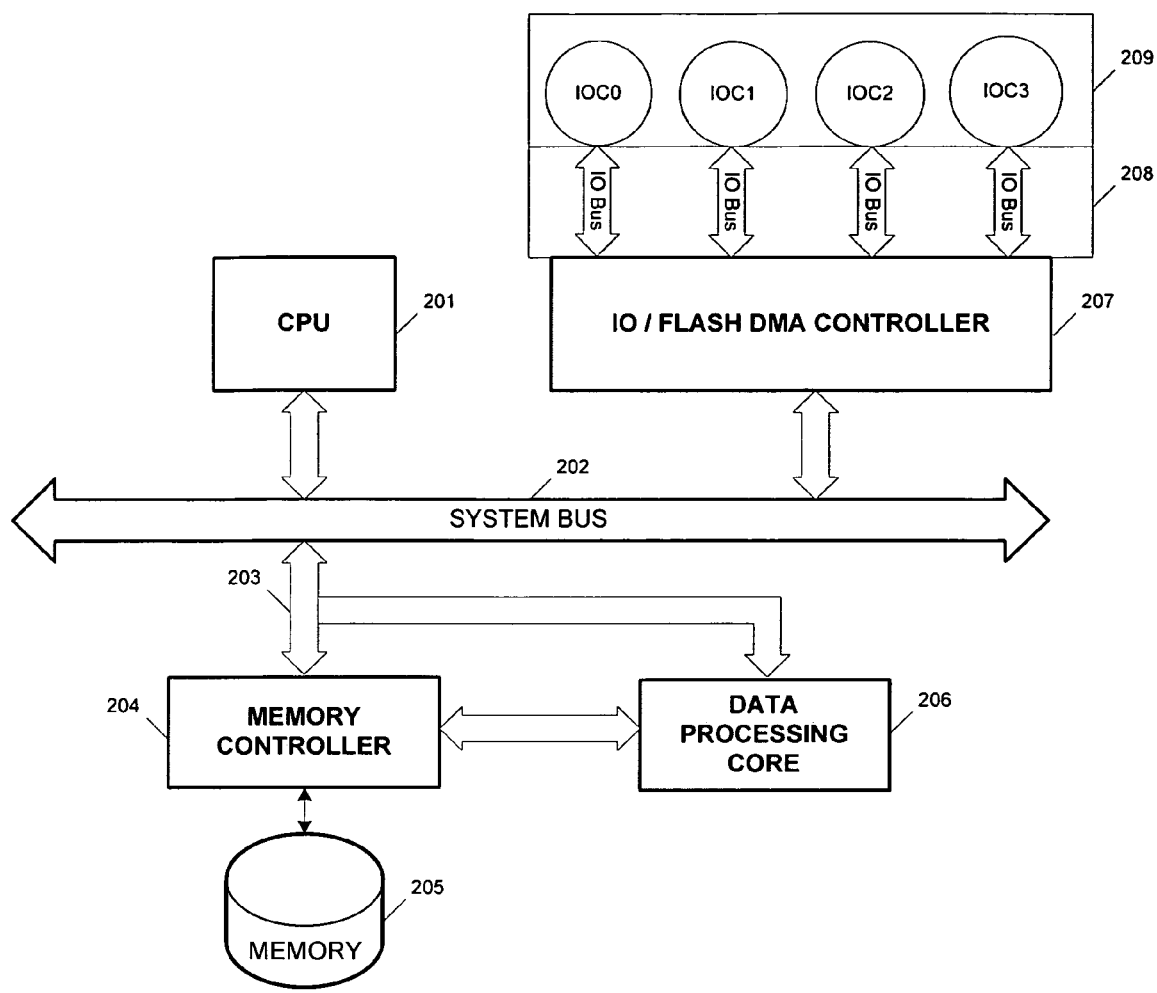
FIG. 2 is a diagram illustrating a Data Processing Core added to the DMA architecture according to an embodiment of the present invention.

FIG. 2 is a diagram illustrating a Data Processing Core added to the DMA architecture according to an embodiment of the present invention. A Data Processing Core (DPC) 206 is attached to the system bus 202. The DPC 206 is also directly interfaced with the Memory Controller 204 to allow data transfer between the DPC 206 and the Memory Controller 204 without going to the system bus 202. The IO controller (IOC) 209 sends a Setup Command to the CPU 201 to indicate which settings to use in the DPC 206 for its IO with data processing transactions. These settings include the data processing-related information such as encryption key, cipher mode, encryption algorithm etc. With this modified architecture, the IOC 209 can request two kinds of IO transactions from the CPU 201—normal IO request and IO with processing request. A normal IO request pertains to all DMA transfers (memory-to-IO for read and IO-to-memory for write) involving no data processing. A normal Write Command is used by the IOC to send data which will be stored in the memory without undergoing any processing. A normal Read Command is used by the IOC to get data stored in the memory without undergoing any processing. An IO with processing request, on the other hand, involves DMA transfers with processing such as encryption or decryption. The IOC can issue a Write with Encrypt Command when it wants its data to be stored after being encrypted. The IOC can also issue a Write with Decrypt Command when it wants its data to be stored after being decrypted. Similarly, the IOC issues a Read with Encrypt Command when it wants to get data after being encrypted. The IOC can use a Read with Decrypt Command when it wants to get data after being decrypted. Furthermore, the IOC can issue an Encrypt or Decrypt Command instead if it has a set of data which it wants to be encrypted or decrypted respectively without being stored in the memory.

Figure 3:
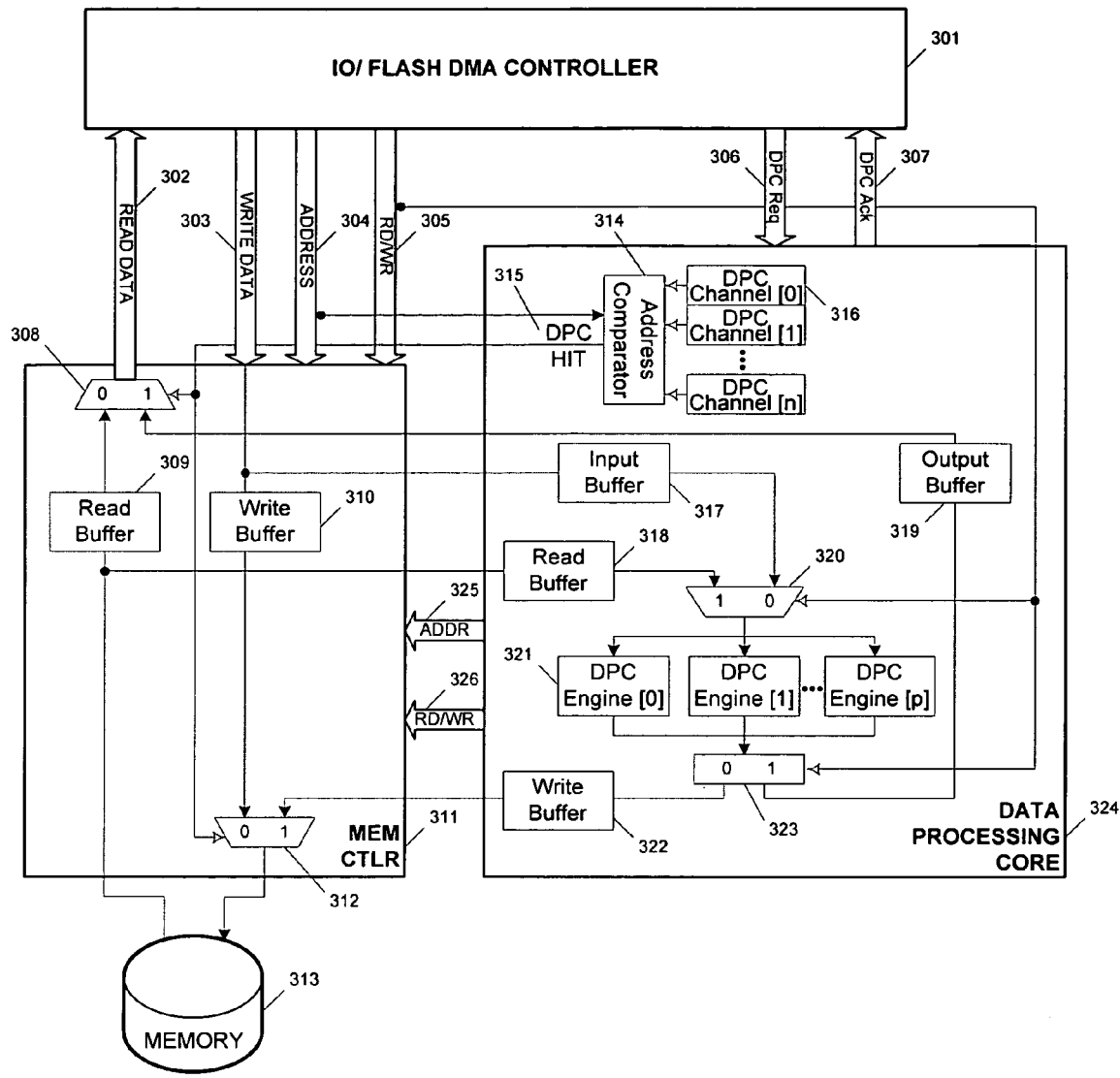
FIG. 3 is a diagram illustrating the interface of the Data Processing Core according to an embodiment of the present invention.

FIG. 3 is a diagram illustrating the interface of the Data Processing Core according to an embodiment of the present invention. The DPC is comprised of 4 major components: Address Comparator 314, one or more DPC Channels such as DPC Channel 316, Buffers (317, 319, 322 and 318) and one or more DPC Engine such as DPC Engine 321. The Address Comparator 314 is the module responsible for detecting which DMA transfer should pass through the DPC for processing. It performs on-the-fly DMA address comparison with all active DPC Channels address ranges. It asserts the DPC Hit 315 signal to activate the DPC write or read data path. A de-asserted DPC Hit means that the DPC will be bypassed for the DMA transfer. Multiple IO requests can be serviced by the one or more DPC channel such as DPC Channel 316. These channels are used to control the one or more DPC engine processing and program the Address Comparator. A DPC Channel is said to be active if a descriptor is currently loaded in its registers. A DPC Channel can be assigned with one or more DPC engines. DPC Engines such as DPC Engine 321 are the processing units responsible for the encryption and decryption of data. The input and output data of these engines are stored in the DPC's Buffers (317, 319, 318 and 322). In order to synchronize the DPC Channel with corresponding DMA Channel, a DPC Dependency Checking protocol is performed every DMA transfer by the DMAC and the DPC. Before initiating a transfer, the DMAC checks the DPC if it is ready for the data transfer by issuing a DPC Request 306. In response, the DPC sends a DPC Acknowledge 307 to indicate that it is ready. This protocol ensures that the DMA data is properly routed.

Figure 4:
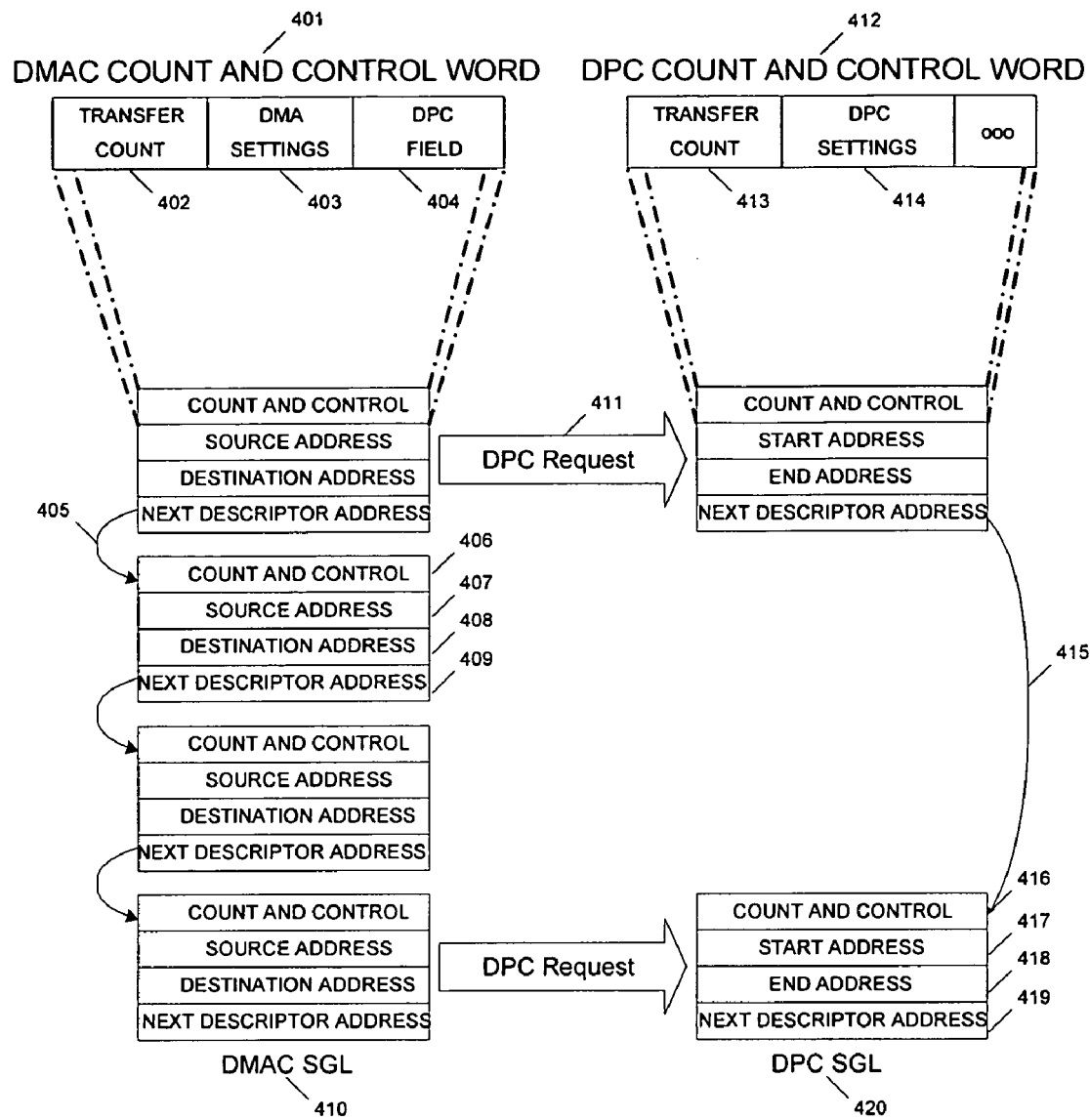
FIG. 4 is a diagram illustrating the relationship of the DPC SGL and the DMAC SGL according to an embodiment of the present invention.

FIG. 4 is a diagram illustrating the relationship of the DPC scatter-gather list (SGL) 420 and the DMAC scatter-gather list (SGL) 410 according to an embodiment of the present invention. An SGL or scatter-gather list is a set of descriptor tables which are used for non-contiguous data transfers. For IO with processing transactions, the CPU creates two sets of descriptor tables: one for the DMAC and one for the DPC. A descriptor table of the DMAC comprises the count and control 406, source address 407, destination address 408 and the next descriptor address 409. On the other hand, a descriptor table of the DPC comprises the count and control 416, start address 417, end address 418 and next descriptor address 419. A count and control word 401 of a DMAC's descriptor table is shown with expanded detail showing that it includes the DMA information and a DPC Field 404 which contains DPC-related information DPC Enable and DPC Index. The DPC Enable bit indicates whether data processing should be performed on the data. If this bit is asserted, the DMAC sends a DPC Request 411 to the DPC. The DPC Request 411 is accompanied by the DPC Index. The DPC Index will be used by the DPC to determine if a DPC Channel is already assigned with that index. If a DPC Channel is assigned with the DPC Index, the DPC responds with a DPC Acknowledge (Ack) signal to the DMAC. This signaling known as the DPC Dependency Checking ensures that both the DMA and DPC Channels are ready during the DMA. The DMAC waits for the DPC Ack signal before initiating the data transfer. The source address 407 of the DMAC points to the source of the data (memory or IO). The destination address 408 of the DMAC points to the destination of the data (memory or IO). The next descriptor address 409 of the DMAC points to the location of the next descriptor table in the linked list. The next descriptor may or may not involve a data processing depending again on the DPC Field 404. A count and control word 412 of the DPC is shown with expanded detail to show that it gives the DMA-related information and the DPC Setting. This DPC Setting specifies the encryption algorithm, the size of the encryption key and the cipher mode to be used by the one or more DPC Engine for data processing. The start address 417 and end address 418 will be used by the DPC's Address Compare Engine to properly route the data. This Address Compare Engine monitors the memory address for a given DMA transfer and determines if there's a DPC HIT. An asserted DPC HIT signal means that the data should be processed before the actual transfer from source to the destination. This occurs when the DMA address is found to be within one of the DPC address ranges. A de-asserted DPC HIT signal on the other hand implies that no data processing will be performed during the data transfer. This happens when the DMA address does not fall within any of the DPC address ranges. The next descriptor address 419 contains the address of the succeeding descriptor in the memory. Each DPC descriptor table is associated with a DMAC descriptor table. But not all DMAC descriptor table corresponds to a DPC descriptor table. The CPU creates this dependency to dynamically turn on and off the DPC for a scatter-gather operation.

Figure 5:
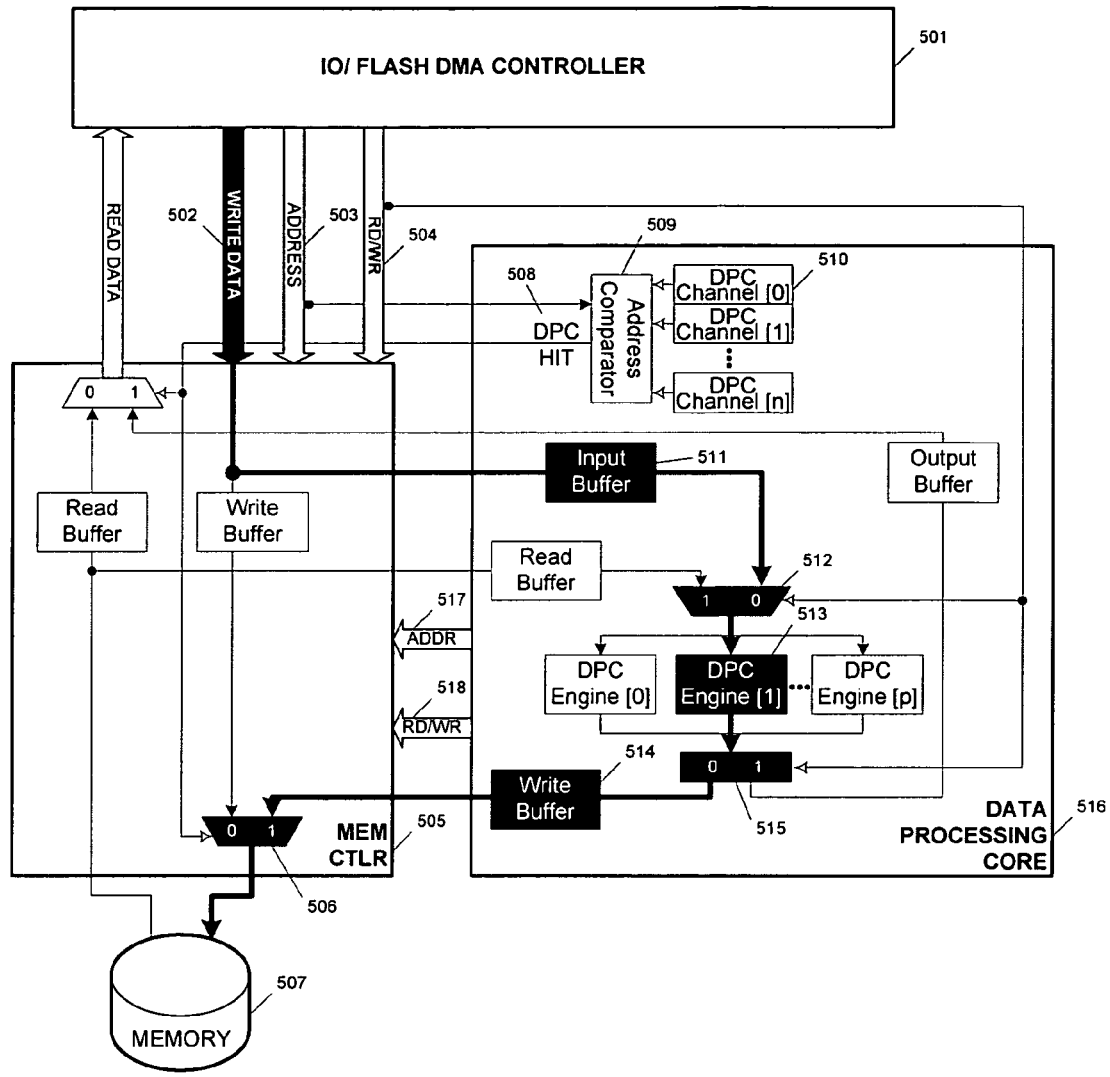
FIG. 5 is a diagram illustrating the data path during an IO write with data processing according to an embodiment of the present invention.

FIG. 5 is a diagram illustrating the data path during an IO write with data processing according to an embodiment of the present invention. The IO/Flash DMA Controller 501 initiates the DMA transfer by posting the corresponding Write Controls and Address to the Memory Controller 505. The Address Comparator 509 in the DPC 516 compares the DMA address 503 with all of the DPC Channel address ranges. The DPC Hit 508 is asserted if the DMA address 503 is found to be within a DPC Channel address range. This signal effectively activates the DPC write data path. The DMAC 501 then writes the DMA data 502. Since the DPC is active, this data is written to the Input Buffer 511 instead of the Write Buffer of the Memory Controller 505. The Input Buffer 511 contains all the data coming from the IOC via the DMAC 501 which are to be processed by the one or more DPC Engine such as DPC Engine 513. The data multiplexer 512 selects from which buffer to get the data to be processed. One or more DPC Engine such as DPC Engine 513 is assigned to a DPC Channel in a need-to-use basis. A DPC Channel 510 may be assigned one or more DPC Engines depending on processing requirements. The DPC Engine 513 performs data encryption and writes the processed data to the Write Buffer 514. The data de-multiplexer 515 selects the buffer to write the data that has been processed. The Write Buffer 514 of the DPC contains all the processed data that should be passed to the Memory Controller 505 and written to the Memory 507. The data multiplexer 506 selects from which buffer to get the data to be written to the Memory 507.

Figure 6:
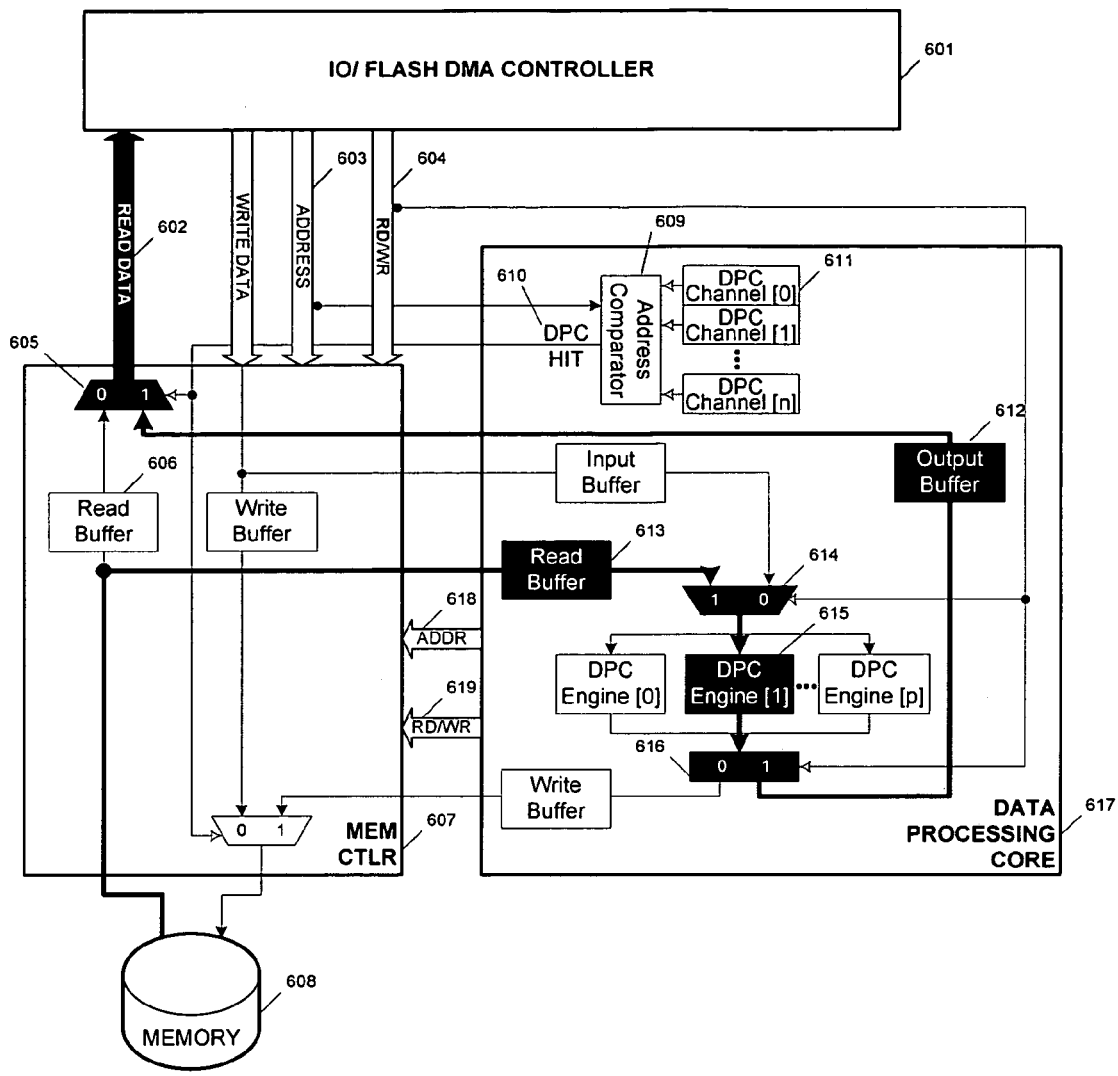
FIG. 6 is a diagram illustrating the data path during an IO read with data processing according to an embodiment of the present invention.

FIG. 6 is a diagram illustrating the data path during an IO read with data processing according to an embodiment of the present invention. The IO/Flash DMA Controller 601 initiates the DMA transfer by posting the corresponding Read Controls and Address to the Memory Controller 607. The Address Comparator 609 in the DPC 617 compares the DMA address 603 with all of the DPC Channel address ranges. The DPC Hit 610 is asserted if the DMA address 603 is found to be within a DPC Channel address range. This signal effectively activates the DPC read data path. DPC 617 sends a read request to the Memory Controller 607 using the same DMA Address 603 posted by the DMAC 601. The data read from the memory 608 is written to the DPC's Read Buffer 613 instead of the Memory Controller's Read Buffer 606. This Read Buffer 613 contains all the data coming from the Memory Controller 607 which are to be processed by the one or more DPC Engine such as DPC Engine 615. The data multiplexer 614 selects from which buffer to get the data to be processed. One or more DPC Engine such as DPC Engine 615 is assigned to a DPC Channel in a need-to-use basis. A DPC Channel 611 may be assigned one or more DPC Engines depending on processing requirements. The DPC Engine 615 performs data decryption and writes the processed data to the Output Buffer 612. The data de-multiplexer 616 selects the buffer to write the data that has been processed. The Output Buffer 612 of the DPC contains all the processed data that should be passed to the DMA Controller 601 and written to the IOC. The data multiplexer 605 selects from which buffer to get the data to be passed to the IOC.

Figure 7:
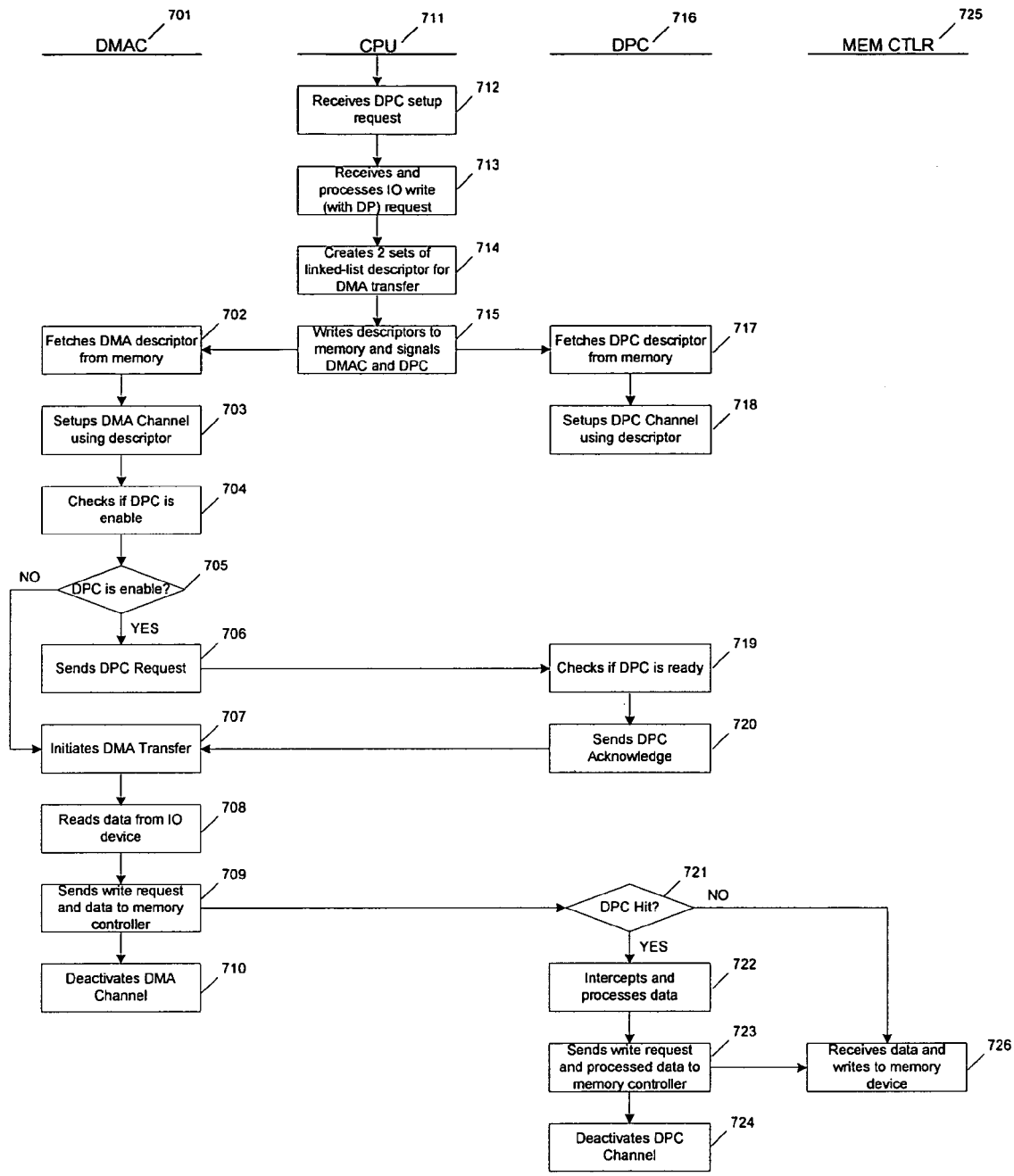
FIG. 7 is a diagram illustrating the DP-enhanced IO-to-memory transfer according to an embodiment of the present invention.

FIG. 7 is a diagram illustrating the Data Processing enhanced IO-to-memory transfer according to an embodiment of the present invention. Data is read from the IO by the IOC DMA controller, processed by the DPC engine and then sent to the memory. In step 712, prior to the DMA transfer, the CPU 711 receives a Setup Request Command from an IOC. The CPU stores and assigns the DPC settings to the IOC. After which in step 713, the IOC sends an IO write with data processing request to the CPU. The CPU in step 714 creates two sets of descriptor table one for DMAC 701 and one for DPC 716 and writes these tables in the memory. The CPU signals the DMAC and DPC by posting the descriptor address in their registers in step 715. In steps 702 and 717, both the DMAC and the DPC fetch their descriptor tables from the memory to be used to setup a DMA Channel and a DPC Channel, respectively. The DMAC in addition to setting up its DMA Channel also checks for the DPC Enable bit to determine if data processing is enabled for that descriptor in step 704. If asserted, the DMAC sends a DPC Request to DPC along with the DPC Index. The DPC looks if the DPC Index is already assigned to a DPC Channel. If the DPC Index is already assigned, it means that the DPC Channel is ready and waiting for the DMA transfer. The DPC then responds with a DPC Ack signal in step 720. The DMAC then initiates the DMA transfer. It reads the data from the IO in step 708 and sends a write request to the Memory Controller 725 by posting the Write Control and Write Address in step 709. Using the Write Address, the DPC's Address Comparator determines that a DPC Channel is hit thus activating the DPC write path. The DMAC writes the DMA data to the Memory Controller but the DPC intercepts these data for processing in step 722. In step 723, the DPC then sends a write request to the Memory Controller using the same Write Address. The Memory Controller grants the request in step 726 and the DPC sends the processed data to the Memory via the Memory Controller. Once the transfer of all processed data is completed, the DPC Channel is deactivated in step 724.

Figure 8:
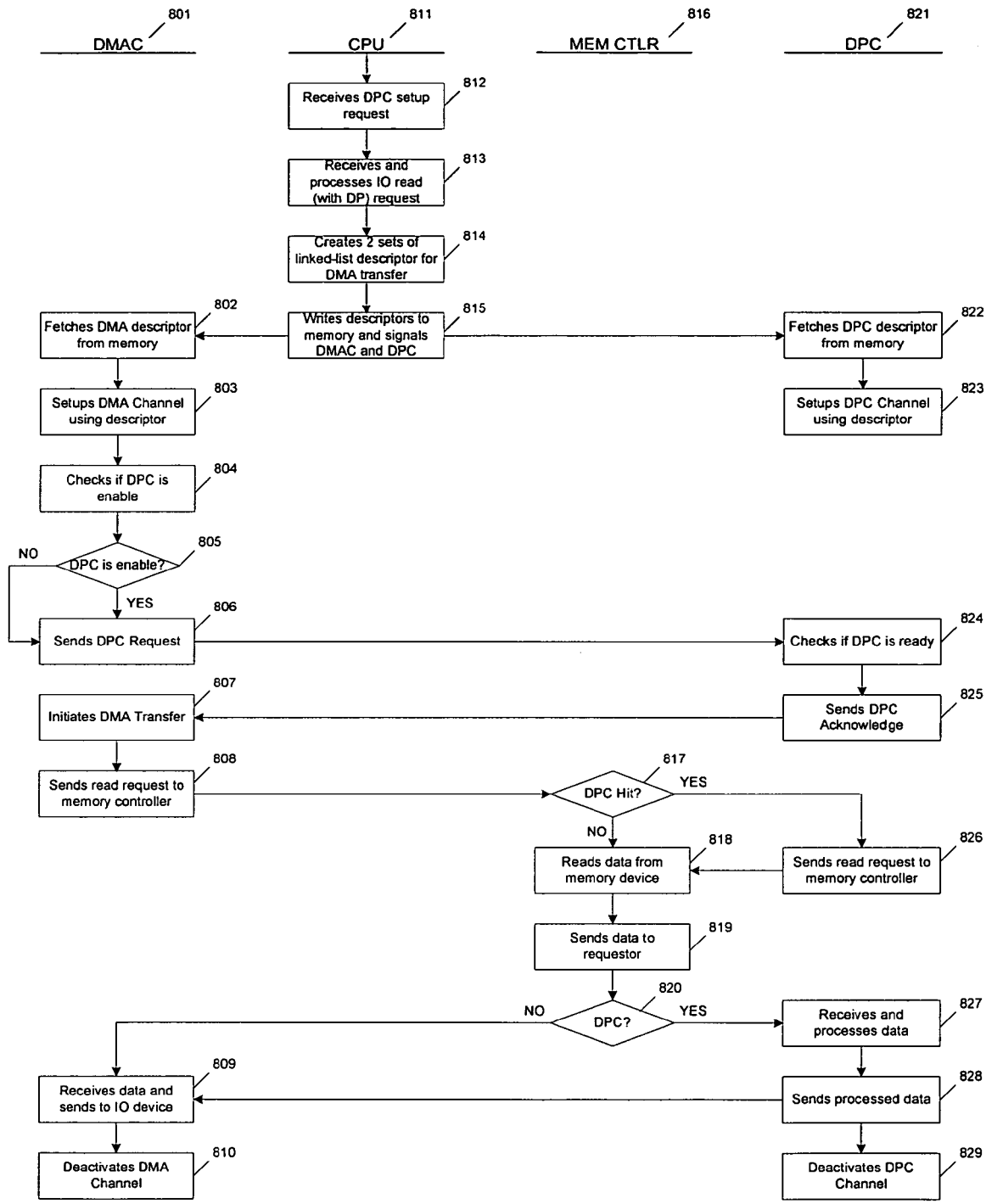
FIG. 8 is a diagram illustrating the DP-enhanced memory-to-IO transfer according to an embodiment of the present invention.

FIG. 8 is a diagram illustrating the Data Processing enhanced memory-to-IO transfer according to an embodiment of the present invention. Data is read from the memory, processed by the DPC engine and then sent to the IO by the IOC DMA controller. In step 812, prior to the DMA transfer, the CPU 811 receives a Setup Request Command from an IOC. The CPU stores and assigns the DPC settings to the IOC. The IOC sends an IO read with data processing request to the CPU in step 813. The CPU creates two sets of descriptor table one for DMAC 801 and one for DPC 821 and writes these tables in the memory. The CPU signals the DMAC and DPC by posting the descriptor address in their registers in step 815. In steps 802 and 822, both the DMAC and the DPC fetch their descriptor tables from the memory to be used to setup a DMA Channel and a DPC Channel, respectively. The DMAC in addition to setting up its DMA Channel also checks for the DPC Enable to determine if data processing is enabled for that descriptor in step 804. If asserted, the DMAC sends a DPC Request to DPC along with the DPC Index. The DPC looks if the DPC Index is already assigned to a DPC Channel. If the DPC Index is already assigned, it means that the DPC Channel is ready and waiting for the DMA transfer. The DPC then responds with a DPC Ack signal in step 825. The DMAC then initiates the DMA transfer. It sends a read request to the Memory Controller 816 by posting the Read Control and Read Address. Using the Read Address, the DPC Address Comparator determines that a DPC Channel is hit thus activating the DPC read path in step 817. If there is a hit, the Memory Controller ignores the read request from the DMAC and instead waits for the DPC read request in step 819. DPC sends a read request to the Memory Controller in step 826 using the same Read Address from the DMAC. The Memory Controller grants the request in step 818, reads data from the Memory and passes to the DPC. The DPC receives the data from the Memory for processing. The DPC sends the processed data to the IO via the DMA Controller in step 828. Once the transfer of all processed data is completed, the DPC Channel is deactivated in step 829.

Figure 9:
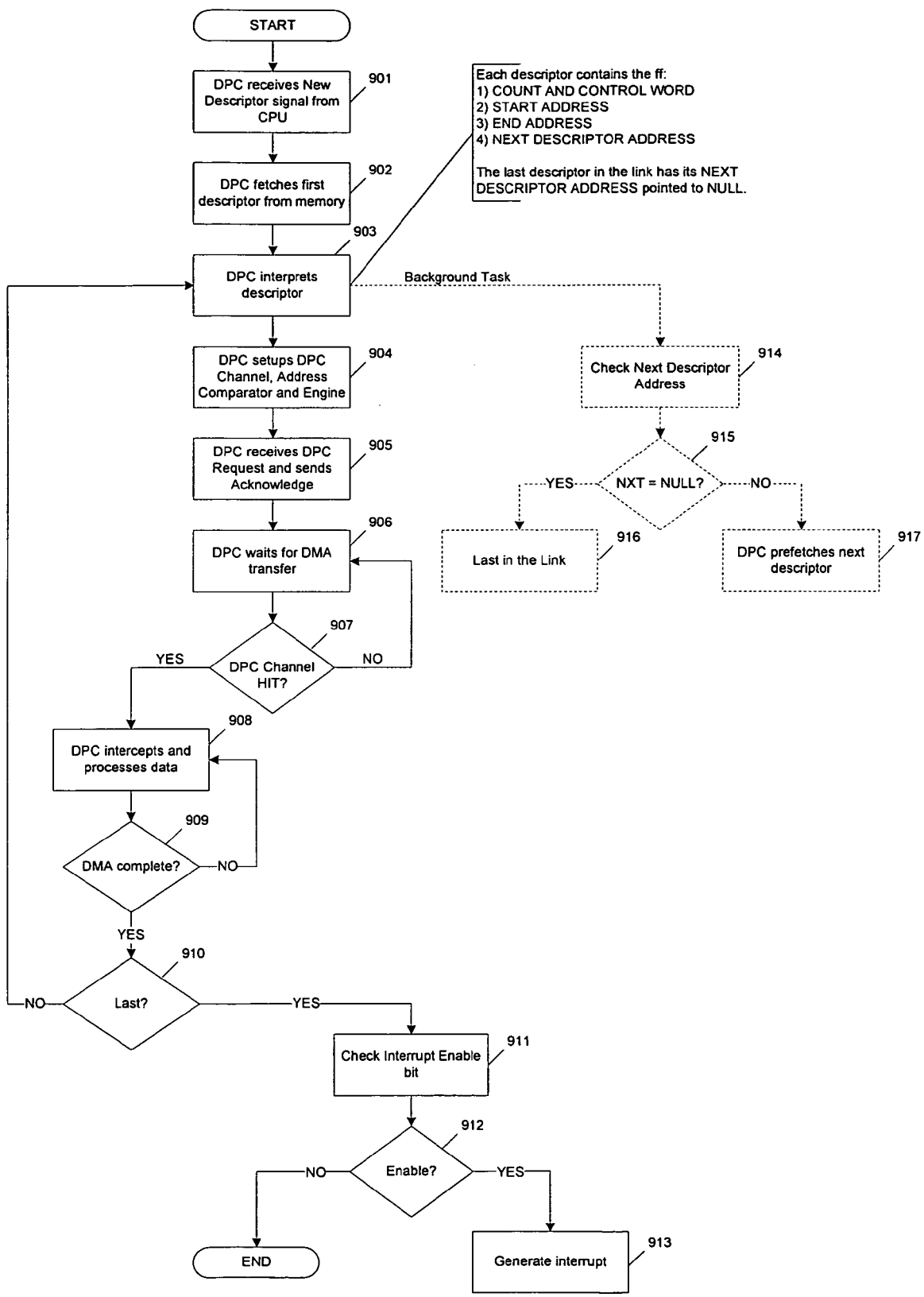
FIG. 9 is a diagram illustrating the operation of the DPC during scatter-gather DMA according to an embodiment of the present invention.

FIG. 9 is a diagram illustrating the operation of the DPC during scatter-gather DMA according to an embodiment of the present invention. Initially in step 901, the CPU informs the DPC of a new descriptor by writing to its register indicating the address of the first descriptor in the memory. DPC assigns a free (not active) DPC Channel before fetching the first descriptor from the memory (DPC issues a read request from the Memory Controller) in step 902. It interprets the descriptor and assigns all the DPC settings to the appropriate DPC Channel's registers in step 903. Consequently, the Address Comparator Engine is also setup to capture all DMA transactions within the newly programmed DPC Channel's address range in step 904. As a background task, it also checks whether there exists a next descriptor in step 914. If the Next Descriptor Address is not pointed to NULL, the DPC prefetches the next descriptor. Meanwhile, the DPC waits for a DPC Request from the DMA Controller. DPC sends a DPC Acknowledge response to indicate to the counterpart DMA channel that the DPC channel is ready for the DMA transfer in step 905. The DMA Controller initiates the DMA transfer (driving the Address and Control Busses) upon receiving the DPC response. The Address Comparator determines whether there's a DPC Hit for every DMA transfer in step 907. It acts as a data router and selects which data path to activate (Memory Controller or DPC). An asserted DPC Hit signal activates the DPC data path while a de-asserted DPC Hit activates the Memory Controller's data path. For every asserted DPC Hit signal, the DPC intercepts the DMA data, stores it in its buffer and performs the corresponding processing using the DPC Channel's settings in step 908. It then sends the data to its destination (Memory via Memory Controller for write and IOC via DMA Controller for read). For every DMA transfer completed, the DPC automatically loads the new descriptor table to the same channel's registers and waits for the corresponding DPC Request from the DMA Channel. If the current descriptor happens to be the last in the link, the DPC updates the DPC Channel's status and sends an interrupt to the CPU (if enabled) in step 913.

Figure 10:
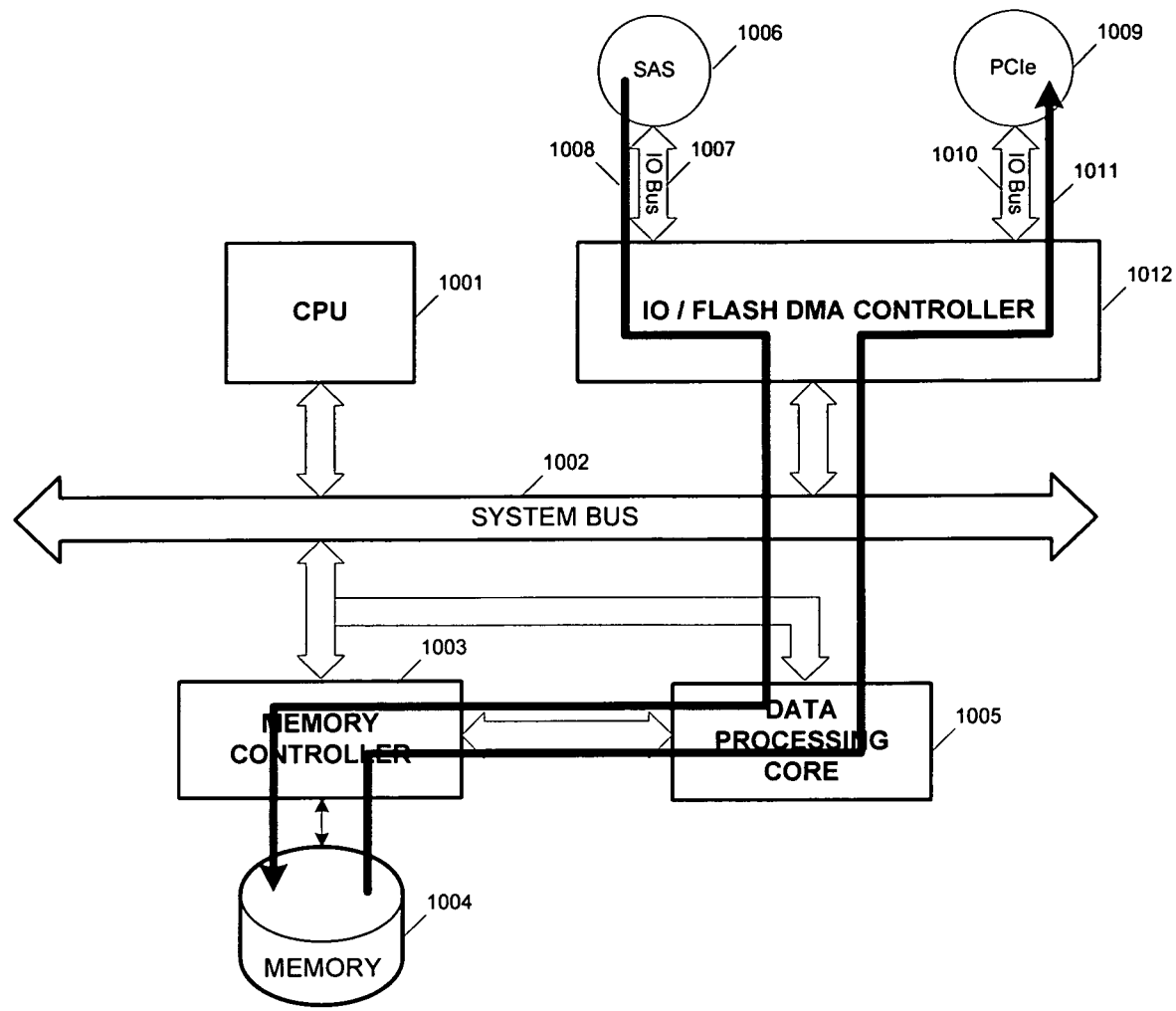
FIG. 10 is a diagram illustrating an end-to-end process flow between SAS and PCI-Express according to an embodiment of the present invention.

FIG. 10 is a diagram illustrating an end-to-end process flow between SAS and PCI-Express according to an embodiment of the present invention. SAS 1006 and PCIe 1009 send a Setup Request Command to the CPU 1001 containing all the data processing information needed for all IO transactions. The CPU then stores the DPC settings. After which, SAS 1006 issues an IO write with data processing request to CPU 1001. The CPU creates a DMA descriptor and a DPC descriptor for the IO request and signals the DMAC 1012 and the DPC 1005. Both DMAC and DPC fetch a corresponding descriptor from the memory by sending a read request to the Memory Controller 1003. The DMAC and the DPC setup its respective channels and perform DPC Dependency Checking When both the DMA and DPC Channels are ready, the DMAC 1012 initiates the write data transfer. DPC Hit is asserted and the DPC write path is activated. The DPC 1005 receives the DMA data from the DMAC, processes it and sends the processed data to the Memory Controller 1003 by issuing a write request. The data from SAS 1006 is now stored in the memory 1004 in encrypted form. After the DMA transfer, both the DMA Channel and the DPC Channel informs the CPU 1001 of the DMA completion. After some time, PCIe 1009 issues an IO read with data processing request using the same data written by the SAS 1006. The CPU 1001 creates a DMA descriptor and a DPC descriptor for the IO request and signals the DMAC 1012 and the DPC 1005. Again, both fetch their corresponding descriptors from the memory by sending a read request to the Memory Controller 1003. The DMAC and the DPC setup its respective channels and perform DPC Dependency Checking When both the DMA and DPC Channels are ready, the DMAC 1012 initiates the read data transfer. DPC Hit is asserted and the DPC read path is activated. The DPC 1005 issues a read request to the Memory Controller. It then receives the DMA data from the Memory Controller, processes it and sends the processed data to PCIe via the DMAC. The data which was originally from SAS 1006 is now passed to PCIe 1009 in decrypted form. After the DMA transfer, both the DMA Channel and the DPC Channel informs the CPU 1001 of the DMA completion.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A computer-enabled method for data processing enhanced DMA data transfers to or from a memory, the method comprising:
   performing a DMA data transfer using one or more DMA engines;
   determining one or more DPC hit signals;
   performing data processing using one or more DPC channels in response to said determining one or more DPC hit signals;
   configuring the one or more DMA engines according to one or more DMA descriptor tables; and configuring the one or more DPC channels according to one or more DPC descriptor tables;

reading a DPC Enable and a DPC Index from the one or more DMA descriptor tables;

using the DPC Enable to determine whether to perform data processing; and using the DPC Index to determine if a DPC Channel is assigned.

2. The method of claim 1, wherein the determining one or more DPC hit signals includes comparing one or more DMA addresses with one or more DPC channel address ranges.

3. The method of claim 1, wherein the one or more DPC channels intercepts one or more DMA data for data processing.

4. The method of claim 1, further includes synchronizing the one or more DMA engines and the one or more DPC channels, said synchronizing includes using a DPC Dependency Checking protocol.

5. The method of claim 4, wherein said using a DPC Dependency Checking protocol includes using a DPC request and a DPC acknowledge.

6. The method of claim 1, further includes using a scatter gather list from the one or more DMA descriptor tables.

7. A computer-enabled method for data processing enhanced DMA data transfers to or from a memory, the method comprising the steps of:

performing a DMA data transfer using one or more DMA engines;

determining one or more DPC hit signals;

performing data processing using one or more DPC channels in response to the determining of one or more DPC hit signals;

configuring the one or more DMA engines according to one or more DMA descriptor tables;

configuring the one or more DPC channels according to one or more DPC descriptor tables;

obtaining a DPC Setting from the one or more DPC descriptor tables; and wherein one or more encryption algorithms, one or more encryption key sizes and one or more cipher modes to be used by one or more DPC Engines for data processing is determined.

8. The method of claim 7, further includes using a scatter gather list from the one or more DPC descriptor tables.

9. The method of claim 7, wherein the one or more DPC engines performs encryption or decryption of one or more DMA data based on the DPC Setting.

10. A computer-enabled apparatus for data processing enhanced DMA data transfers to or from a memory, comprising:

a means for performing DMA data transfers, said means for performing DMA transfers disposed to use one or more DMA engines;

a means for performing data processing, said means for performing data processing disposed to use one or more DPC channels and to respond to one or more DPC hit signals;

a processing device disposed to configure one or more DMA engines according to one or more DMA descriptor tables;

said processing device further disposed to configure one or more DPC channels according to one or more DPC descriptor tables;

wherein the one or more DMA descriptor tables comprises a DPC Enable and a DPC Index;

wherein the means for performing data processing is further disposed to use the DPC Enable to determine whether to perform data processing; and wherein the means for performing data processing is further disposed to use the DPC Index to determine which of the one or more DPC Channels are assigned.

11. The apparatus of claim 10, further including an address compare engine disposed to compare one or more DMA addresses with one or more DPC channel address ranges.

12. The apparatus of claim 10, wherein the one or more DPC channels is disposed to intercept one or more DMA data for data processing.

13. The apparatus of claim 10, wherein the one or more DMA engines and the one or more DPC channels are disposed to use a DPC Dependency Checking protocol for synchronization.

14. The apparatus of claim 10, wherein the DPC Dependency Checking protocol comprises a DPC request and a DPC acknowledge.

15. The apparatus of claim 10, wherein the one or more DMA descriptor tables comprises a scatter gather list.

16. The apparatus of claim 10, wherein the one or more DPC descriptor tables comprises a scatter gather list.

17. A computer-enabled apparatus for data processing enhanced DMA data transfers to or from a memory, comprising:

a means for performing DMA data transfers, said means for performing DMA transfers disposed to use one or more DMA engines;

a means for performing data processing, said means for performing data processing disposed to use one or more DPC channels and to respond to one or more DPC hit signals;

a processing device disposed to configure one or more DMA engines according to one or more DMA descriptor tables;

said processing device further disposed to configure one or more DPC channels according to one or more DPC descriptor tables;

wherein the one or more DPC descriptor tables comprises a DPC Setting; and the DPC Setting including information that specifies at least one encryption algorithm, at least one encryption key size, and at least one cipher mode to be used by at least one DPC Engine for data processing.

18. The apparatus of claim 17, wherein the one or more DPC engines are disposed to perform encryption or decryption of one or more DMA data based on the DPC Setting.

19. A direct memory access controller for transferring data to or from a memory, and for encrypting or decrypting said data upon receiving a data processing request, the direct memory access controller comprising:

a means for performing a DMA data transfer, said means for performing a DMA data transfer including at least one DMA engine configured for transferring data;

a means for performing data processing coupled to said means for performing a DMA data transfer, said data processing includes encrypting or decrypting said data in response to a DPC hit signal by at least using a DPC channel to intercept said data, causing said data to be transferred to said means for performing data processing.

20. The direct memory access controller of claim 19, wherein said DPC hit signal is asserted if one or more DMA addresses is determined to be within a DPC channel address range.

21. The direct memory access controller of claim 20, wherein:
 said at least one DMA engine is configured by at least using a DMA descriptor table that includes a DPC Enable for causing said means for performing data processing to encrypt or decrypt said data; and
 said DPC channel is configured by at least using a DPC descriptor table.

22. The direct memory access controller of claim 19, wherein said means for data processing is disposed not to process said data if said data is not intercepted.

23. The direct memory access controller of claim 19, wherein if said DPC channel is not used to intercept said data, said data processing does not include encrypting or decrypting said data.

\* \* \* \* \*